(12) United States Patent
Kiperberg et al.

(10) Patent No.: US 9,104,841 B2
(45) Date of Patent: Aug. 11, 2015

(54) METHODS AND SYSTEMS FOR EXECUTING PROTECTED CONTENT

(71) Applicant: UNIVERSITY OF JYVÄSKYLÄ, Jyväskylän yliopisto (FI)

(72) Inventors: Michael Kiperberg, Jyväskylän yliopisto (FI); Nezer Zaidenberg, Jyväskylän yliopisto (FI)

(73) Assignee: TRULY PROTECT OY, Jyvaskylan (FI)

( * ) Notice: Subject to any disclaimer, the term of this patent is extended or adjusted under 35 U.S.C. 154(b) by 133 days.

(21) Appl. No.: 13/889,609

(22) Filed: May 8, 2013

(65) Prior Publication Data

US 2014/0337637 A1   Nov. 13, 2014

(51) Int. Cl.
*G06F 21/00* (2013.01)
*H04L 29/06* (2006.01)

(52) U.S. Cl.
CPC .................................... *G06F 21/00* (2013.01)

(58) Field of Classification Search
CPC ..... H04L 63/1433; G06F 21/00; G06F 21/51; G06F 21/52; G06F 21/53; G06F 21/566
See application file for complete search history.

*Primary Examiner* — Izunna Okeke
(74) *Attorney, Agent, or Firm* — Barnes & Thornburg LLP

(57) ABSTRACT

Various embodiments for enabling and protecting execution of encrypted electronic content in a client system. In various embodiments, there is a method for managing the state of the cache memory of the client system. In various embodiments, there is a method for protocol stack validation to confirm readiness of the client system to execute encrypted electronic content. In various embodiments, there is a method for protocol stack execution.

14 Claims, 5 Drawing Sheets

Client System 100

METHODS AND SYSTEMS FOR EXECUTING PROTECTED CONTENT

BACKGROUND

Publishers of electronic content such as games and videos are often concerned with protecting their electronic content from unlicensed usage, since unlicensed usage may have a significant adverse impact on the profitability or even on commercial viability of such publishers. Commercial electronic content often includes a simple licensing verification program, but such a program may be bypassed by reverse engineering the software instructions of the program.

Some publishers protect their electronic content by "obfuscation", which means making software instructions difficult for humans to understand. This method deliberately clutters the code with useless, confusing pieces. However, one problem with this method is that obfuscated electronic content is readable to the skilled hacker.

Some publishers protect their electronic content by encryption, using a unique key to translate their code to an unreadable format, such that only the owner of the key can decrypt the code. However, such protection is only effective when the key is kept secure. Hardware based methods for keeping the key secure are possible. However, hardware based methods have two deficiencies. First, they require an investment in special-purpose hardware on the user's side, which is costly and, therefore, not practical. Secondly, all such hardware methods were successfully attacked by hackers.

There are existing software-based methods of encrypting and decrypting electronic content, where decryption is performed in the client system's CPU. However, existing methods have three independent problems. Firstly, such methods remain susceptible to hacking, since the CPU's content is synchronized with other parts of the client system's memory with respect to the decrypted content. Secondly, the protocol stack execution in existing methods decrypts a single encrypted instruction at a time, so an instruction that is executed in a loop, gets decrypted on every iteration of this loop, causing a degradation in the performance of the whole system. Thirdly, existing methods do not test: (1) whether the decryption will be performed on software which imitates the functionality of hardware, or (2) whether the instructions used to decrypt and execute the encrypted electronic content have been properly installed. Failure to test either of these two conditions can expose existing software-based protection methods to failures.

SUMMARY

Described herein are software-based methods for protecting encrypted electronic content from susceptibility to hacking during the decryption of the electronic content, as well as systems for implementing such methods. The present disclosure also comprises implementation examples of a data processing system adapted to carry out the methods according to the invention and/or its embodiments/cases.

One embodiment is a method for enabling execution of encrypted electronic content in a client system. In one particular form of such embodiment, encrypted electronic content is downloaded to a client system and a client system is asked to run the encrypted electronic content. Also in this particular embodiment, a virtual machine is loaded to the client system's first memory region and synchronization between the first memory region and the client system's second memory region is disabled. Also in this particular embodiment, an electronic verification protocol stack is validated, to confirm readiness of the client system to execute the encrypted electronic content. The encrypted electronic content is copied to another location in the second memory region of the client system and the original location of the second memory region is filled with illegal instructions. Also in this particular embodiment, an illegal instruction handler is installed in the operating system of the client system CPU, and the virtual machine jumps to the encrypted electronic content's entry function.

One embodiment is a method for validating an electronic validation protocol stack to confirm readiness of a client system to execute encrypted electronic content. In one particular form of such embodiment, a virtual machine is loaded to a client system's first memory region, and synchronization between the first memory region and a second memory region in the client system is disabled. Also in this particular embodiment, a server is requested to execute an electronic validation protocol stack validation for an encrypted electronic content. Also, in this particular embodiment the results of the validation protocol stack confirmation are received, and if the electronic validation protocol stack validation has succeeded, a decryption key is requested and received from a server. Also in this particular embodiment, the decryption key is stored in the first memory region.

One embodiment is a method for executing encrypted electronic content. In one particular form of such embodiment, a client system's CPU informs a virtual machine that there are illegal instructions, and the virtual machine becomes active. Also in this particular embodiment, the client system's operating system activates an illegal instruction handler, which identifies and erases decrypted blocks in first memory region, and finds an encrypted data block that corresponds to the block containing the CPU's instruction pointer in the second memory region, deleting the illegal instructions of such blocks, and substituting-in legal instructions that can be interpreted. Also in this particular embodiment the illegal instruction handler decrypts a data block with substituted-in legal instructions, which can be interpreted by the CPU, and stores the decrypted data block in the first memory region. Also in this embodiment, the above-described decryption process loops back to the beginning and continues until the execution of the encrypted electronic content is terminated by the user.

One embodiment is a method for managing a first memory region as part of a process for executing encrypted electronic content. In one particular form of such embodiment, a kernel and a virtual machine are loaded to a first memory region. Also in this embodiment, synchronization between the first memory region and a second memory region is disabled. Also in this embodiment, an electronic validation protocol stack is validated, to confirm readiness of a client system to execute encrypted electronic content. Also in this embodiment, encrypted electronic content is decrypted, and the decrypted data blocks are stored. The process of decrypting and storing data blocks continues until it is terminated by the user, then the synchronization between the first memory region and the second memory region is re-enabled.

Further embodiments include data processing systems, such as client systems, for enabling execution of encrypted electronic content. Such a client system comprises a processing system comprising at least one central processing unit, "CPU", a memory system having a first memory region and a second memory region. The memory system comprises program code instructions for carrying out the acts which implement the methods of the invention and/or its embodiments/cases when the program code instructions are executed by the processing system.

BRIEF DESCRIPTION OF THE DRAWINGS

The embodiments are herein described, by way of example only, with reference to the accompanying drawings. No attempt is made to show structural details of the embodiments in more detail than is necessary for a fundamental understanding of the embodiments. In the drawings.

DETAILED DESCRIPTION OF SPECIFIC EMBODIMENTS

Figure 1:
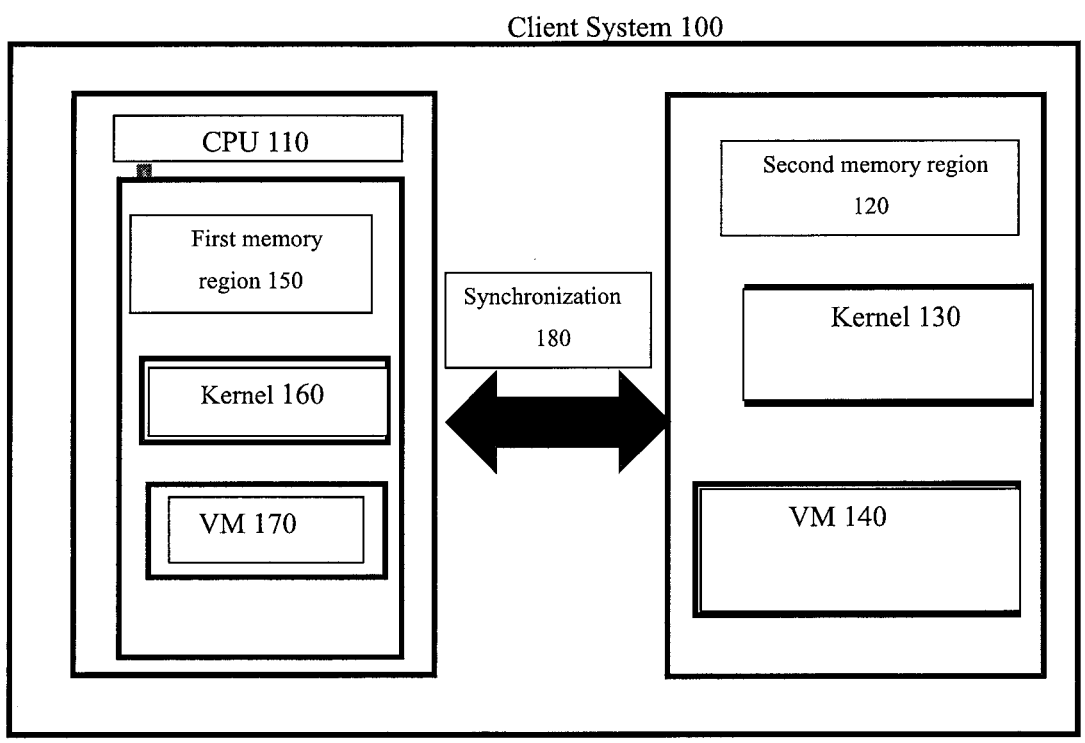
FIG. 1 illustrates one embodiment of a client system which enables the execution of encrypted electronic content by the client system, in a state where the content of the client system's first memory region does not differ from corresponding content in the second memory region of the client system.

Where used in this application, the following terms mean as follows:

"Client system" means any kind of consumer data unit having a memory region and a region for processing electronic content.

"Disabled state" means that the content of the first memory region of a client system differs substantially from corresponding content in the second memory region of a client system.

"Electronic content" means a software program, blocks of data, or any other electronically stored information, including but not limited to applications such as video, audio, or gaming programs, and including gaming programs played synchronously and non-synchronously among two or more people.

"Electronic validation protocol stack" is a group of program instructions, which may be part of a software protocol stack or which may be separate, that are used to decrypt and execute the instructions of encrypted electronic content.

"Encrypted electronic content" means "electronic content" which has been encrypted in some way.

"First memory region" means a memory region that is part of or in direct content with a CPU. This may be a memory region in the cache part of a CPU, a memory region in a non-cache region of a CPU, or a memory region that is external to the CPU but which is connected directly to the CPU. In a first memory region, "connected directly" means that there is a direct connection between the first memory region and the CPU, but the first memory region is not part of or connected to the main memory region.

"Gaming" means war games, sports, gambling and all other games.

Included are games played by a single person, games played synchronously by multiple players, and games played non-synchronously by multiple players. In this context, "played synchronously" means either that multiple players are acting at the same time, or players respond to each other essentially in real-time.

"Illegal instructions" means a sequence of bytes that, when encountered by a client system CPU, result in a notice to the operating system of the client system, which contains the CPU, that such bytes cannot be interpreted.

"Illegal instructions handler" means a module included in the VM that: (1) identifies illegal instructions, deletes them, and substitutes-in legal instructions, and (2) identifies blocks that are encrypted and decrypts them, so that the decrypted results may be stored in a location in the first memory region.

"Kernel" means the component of the client system's operating system that manages the client system's processing resources.

"Legal instructions" means a sequence of bytes that, when encountered by a client system's CPU, can be interpreted by the CPU.

"Memory region" means a physical space that has a memory capability, and that stores electronic content. It may be, without limitation, any part or all of a CPU, a main memory, a cache memory, or an external standalone memory.

"Operating System" means software that is executed in privileged mode by the CPU and has full control of the hardware of the client system as well as any other software that is executed on the client system. The operating system includes the kernel and may include other modules.

"Protocol stack validation" means a validation of any or all of the following: (1) that decryption of encrypted content will occur at a legal computer or other legal client, as opposed to a virtual machine; (2) that the VM has been properly installed, (3) other criteria checked to insure that the client system can execute one or more embodiments of the methods.

"Second memory region" means a memory region that is part of or in direct content with a main memory. This may be a memory region within the main memory, or a memory region that is external to the main memory but which is connected directly to the main memory. In a second memory region, "connected directly" means that there is a direct connection between the second memory region and the main memory, but the second memory region is not part of or connected to the CPU.

"Synchronization" means that the content of the first memory region of a client system does not differ substantially from corresponding content in the second memory region of a client system.

"Virtual Machine" or "VM" means one or more operating system software modules installed by the user of a client system which is able to (i) disable the cache memory synchronization between a first memory region and a second memory region, and (ii) decrypt encrypting instruction by means of an illegal instructions handler.

FIG. 1 illustrates one embodiment of the client system 100 whose CPU 110 interfaces with the client system's second memory region 120 that contains the software instructions of a kernel 130 and a VM 140. The client system's CPU 110 contains or is in direct contact with the first memory region 150 that reflects the content of the second memory region 120, in particular it reflects the software instructions of the kernel 160 and the VM 170. This reflection is possible due to a physical link between the CPU and the second memory region of the client system, which allows for their synchronization 180, such that the content of the first memory region does not differ from the corresponding content in the second memory region.

Figure 2:
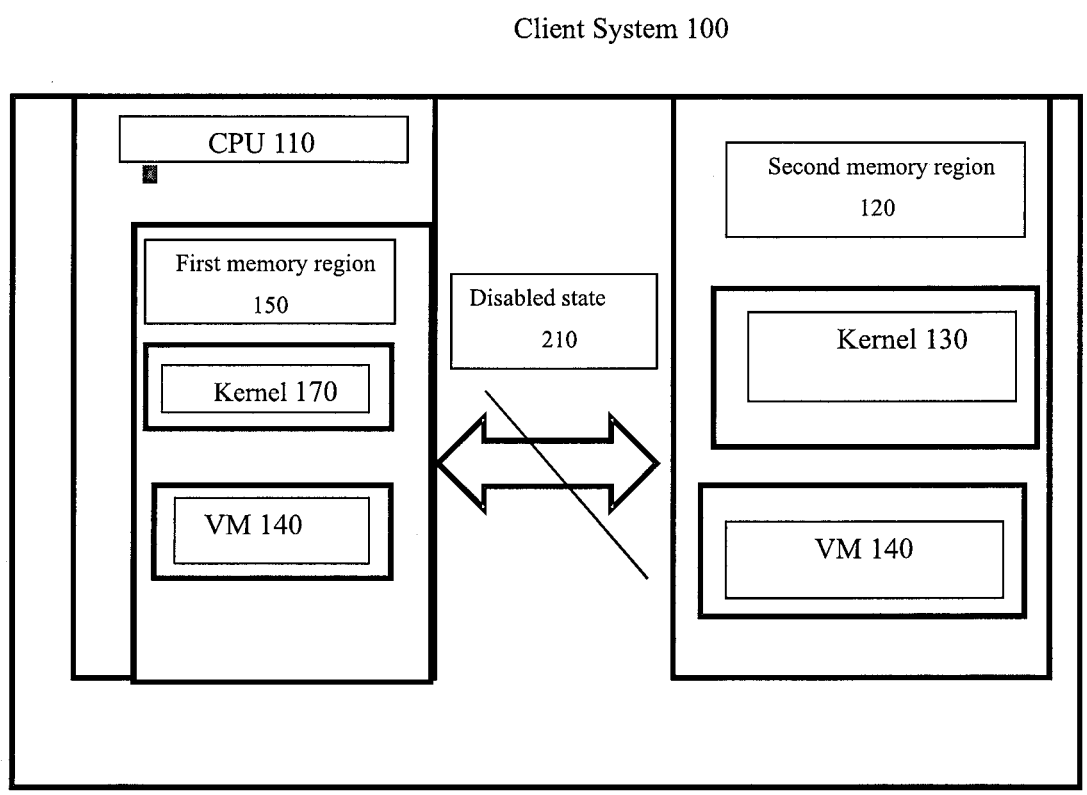
FIG. 2 illustrates one embodiment of a client system in a state that enables the execution of encrypted electronic content by the client system, where the content of the first memory region differs from corresponding content in the second memory region of the client system.

FIG. 2 illustrates one embodiment of a client system 100 whose CPU 110 interfaces with the client system's second memory region 120 that contains the software instructions of a kernel 160 and a VM 170. The CPU 110 contains or is in direct contact with the first memory region 150 that does not reflect the content of the second memory region 120, in particular it does not reflect the software instructions of the kernel 160 and the VM 170 in the first memory region. This reflection is not possible despite the existence of a physical link between the CPU and the second memory region of the client system, since the link is in a disabled state 210.

Figure 3:
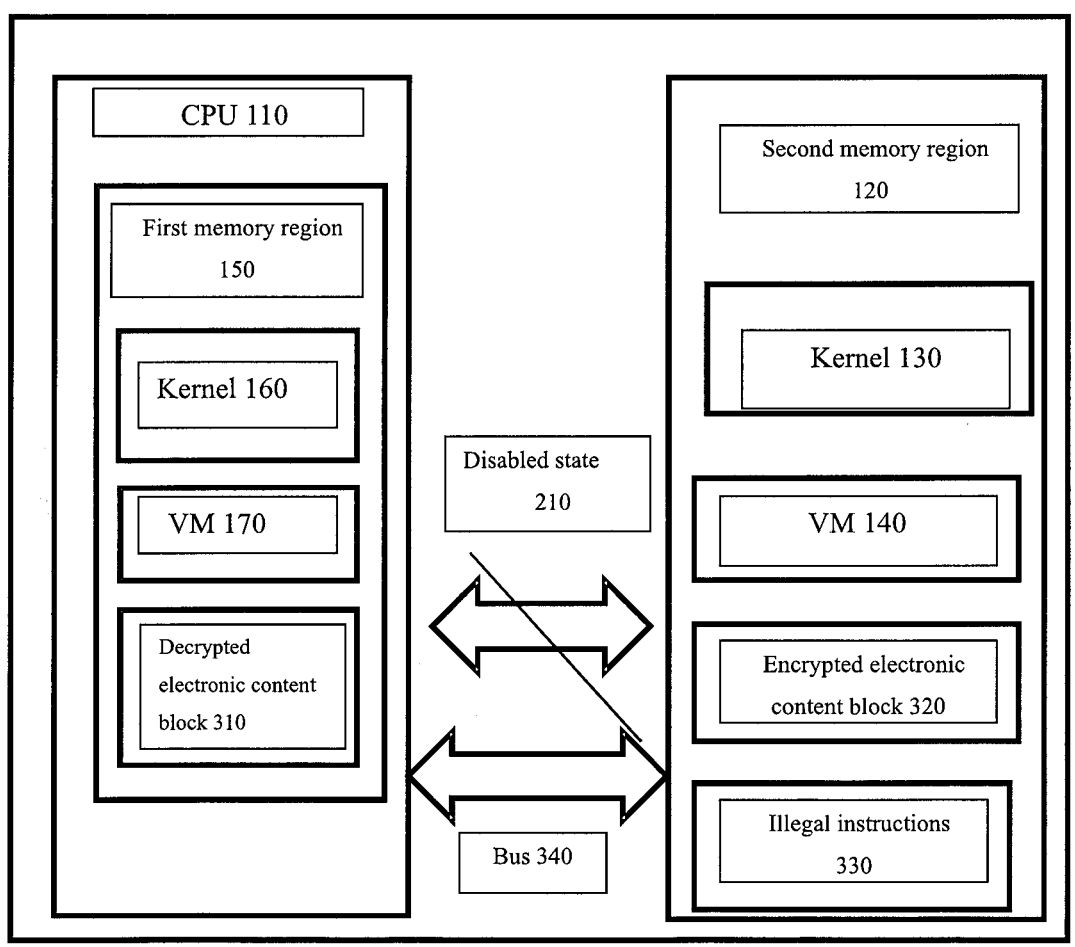
FIG. 3 illustrates one embodiment of a client system which enables the execution of encrypted electronic content by the client system, in a state of operation.

FIG. 3 illustrates one embodiment of a client system 100 whose CPU 110 contains or is in direct contact with the first memory region 150. The first memory region contains the software instructions of a kernel 160 and a VM 170 installed by the user of the client system. The first memory region now also contains the decrypted electronic content in the first memory region 310. The client system's second memory region 120 contains the software instruction of a kernel 130 and a VM 140 and encrypted electronic content 320, and a part of the second memory region is filled with illegal instructions 330. The client system's bus 340 maintains synchronization between the first memory region and the second memory region for blocks of data and instructions, but does not maintain synchronization between the software instructions of the kernel and the VM in the first memory region and the second memory region whose synchronization has been altered to a disabled state 210.

Figure 4:
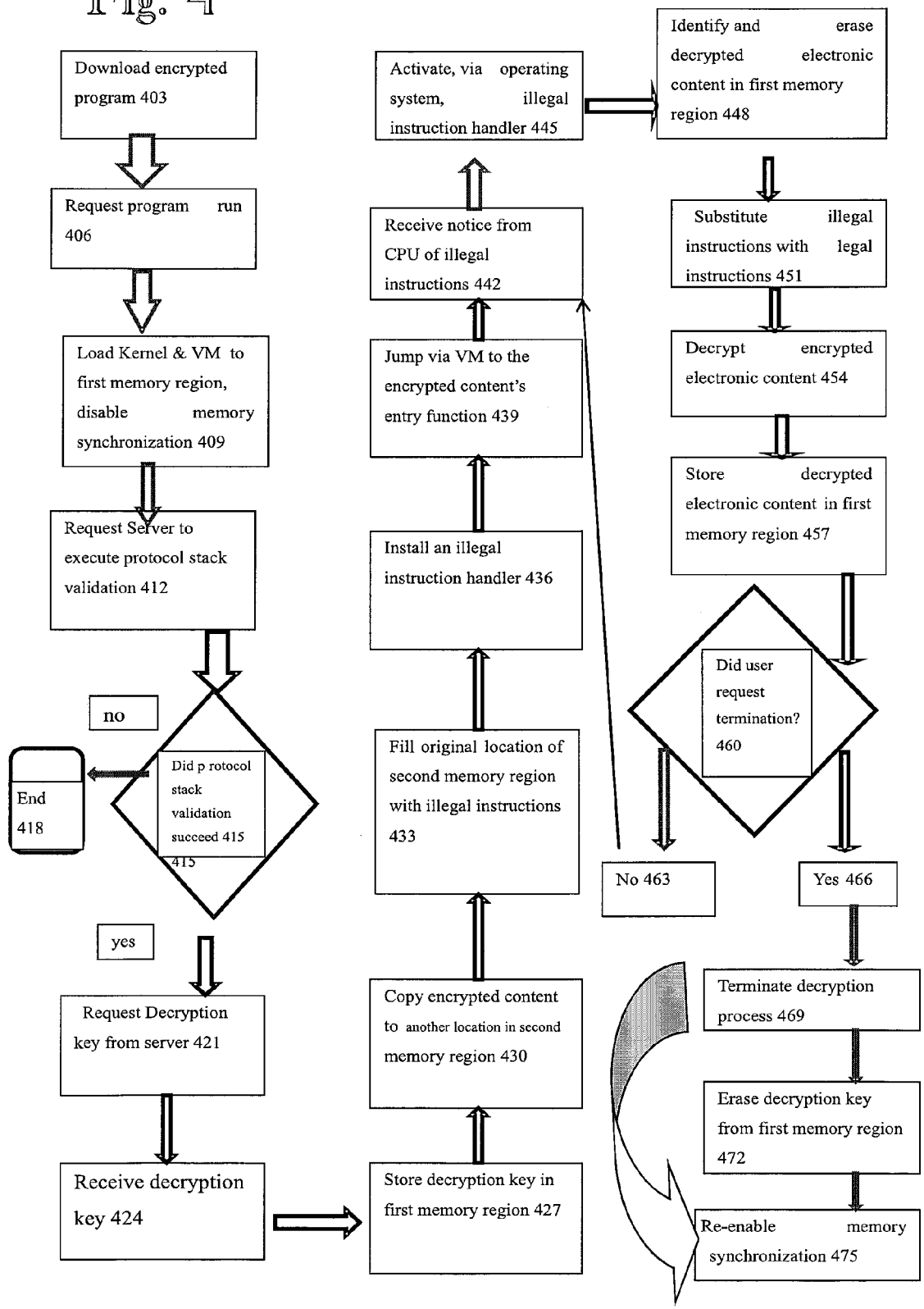
FIG. 4 illustrates a flow diagram describing one embodiment of (i) a method for enabling execution of encrypted electronic content in a client system; (ii) a method for managing the state of the first memory region of the client system (iii) a method for protocol stack validation to confirm readiness of a client system to execute encrypted electronic content, by means of an electronic validation protocol stack; and (iv) a method for protocol stack execution where the entire function is decrypted and then erased.

FIG. 4 illustrates a flow diagram of one embodiment of various methods for enabling execution of encrypted electronic content in a client system.

In one embodiment, the client downloads encrypted electronic content along with a VM 403, and then asks the VM to run the encrypted electronic content 406. The VM loads a kernel and the VM itself to the client system's first memory region and then disables the memory synchronization 409. An electronic validation protocol stack is validated to confirm readiness of the client system to execute the encrypted electronic content 412-427. The VM copies all of the encrypted electronic content to another location in the client system's second memory region 430. The VM fills the original location of the client system's second memory region with illegal instructions 433. The VM installs in the kernel an illegal instruction handler 436. The VM jumps to the encrypted electronic content's entry function 439.

In a first alternative embodiment of the method just described, the encrypted electronic content comprises a program selected from the group of word processing program, spreadsheet manipulation program, and visual presentation program.

In a second alternative embodiment of the method just described, the encrypted electronic content comprises audio or video data.

In a third alternative embodiment of the method just described, the encrypted electronic content comprises an interactive gaming program.

In one embodiment, an electronic validation protocol stack is validated to confirm readiness of a client system to execute an encrypted program, as a condition for the client system's receipt of the decryption key. The client requests a server to execute a protocol stack validation 412. Client receives notification of protocol stack validation results 415. If the protocol stack validation has failed, the execution of the encrypted electronic content terminates 418. If the protocol stack validation has succeeded, the client system requests a decryption key from the server 421 and receives the decryption key 424. The client system stores the decryption key in the first memory region 427.

In a first alternative embodiment of the method just described, the encrypted electronic content comprises a program selected from the group of word processing program, spreadsheet manipulation program, and visual presentation program.

In a second alternative embodiment of the method just described, the encrypted electronic content comprises audio or video data.

In a third alternative embodiment of the method just described, the encrypted electronic content comprises an interactive gaming program.

In one embodiment, encrypted electronic content is executed in the CPU. The CPU informs the operating system of an illegal instruction 442. The operating system activates the illegal instruction handler 445. The illegal instruction handler first identifies decrypted blocks of the encrypted electronic content in a first memory region, and, if there are any, erases them 448. The illegal instruction handler then finds a current encrypted data block, deletes the illegal instructions of such block, and substitutes them legal instructions 451. For this FIG. 4, "current" encrypted data is data which was copied at the step represented by element 430. Using the decryption key, the illegal instruction handler decrypts the encrypted data block with legal instructions that have been substituted for illegal instructions 454. The decrypted data block is stored in the first memory region 457. If the user did not terminate the encrypted electronic content 460, then method described loops back 463 to step 442, and if the user terminates the encrypted electronic content 466 then the decryption process terminates 469. Instructions of the decrypted data blocks will be executed automatically to provide the content, and this execution begins at the end of each iteration of the decryption process.

In a first alternative embodiment of the method just described, the encrypted electronic content comprises a program selected from the group of word processing program, spreadsheet manipulation program, and visual presentation program.

In a second alternative embodiment of the method just described, the encrypted electronic content comprises audio or video data.

In a third alternative embodiment of the method just described, the encrypted electronic content comprises an interactive gaming program.

In one embodiment, a client system's first memory region is managed as part of a process for executing encrypted electronic content. The VM loads a kernel and the VM itself to the first memory region memory and then disables memory synchronization between the first memory region and the second memory region 409. An electronic validation protocol stack is validated to confirm readiness of the client systems to execute the encrypted electronic content 412 through 427. Encrypted electronic content is decrypted and stored 442 through 466. The decryption and storage process is terminated 469, and memory synchronization in re-enabled 475.

In a first alternative embodiment, electronic content comprises a program selected from the group of word processing program, spreadsheet manipulation program, and visual presentation program.

In a second alternative embodiment of the method just described, the encrypted electronic content comprises audio or video data.

In a third alternative embodiment of the method just described, the encrypted electronic content comprises an interactive gaming program.

In a fourth alternative embodiment of the method just described, the decryption key is erased from the first memory region 472.

In a fifth alternative embodiment of the method just described, the decryption key is erased from the first memory region 472 and the electronic content comprises a program selected from the group of word processing program, spreadsheet manipulation program, and visual presentation program.

In a sixth alternative embodiment of the method just described the decryption key is erased from the first memory region 472 and the encrypted electronic content comprises audio or video data.

In a seventh alternative embodiment of the method just described, the decryption key is erased from the first memory region 472 and the encrypted electronic content comprises an interactive gaming program.

Figure 5:
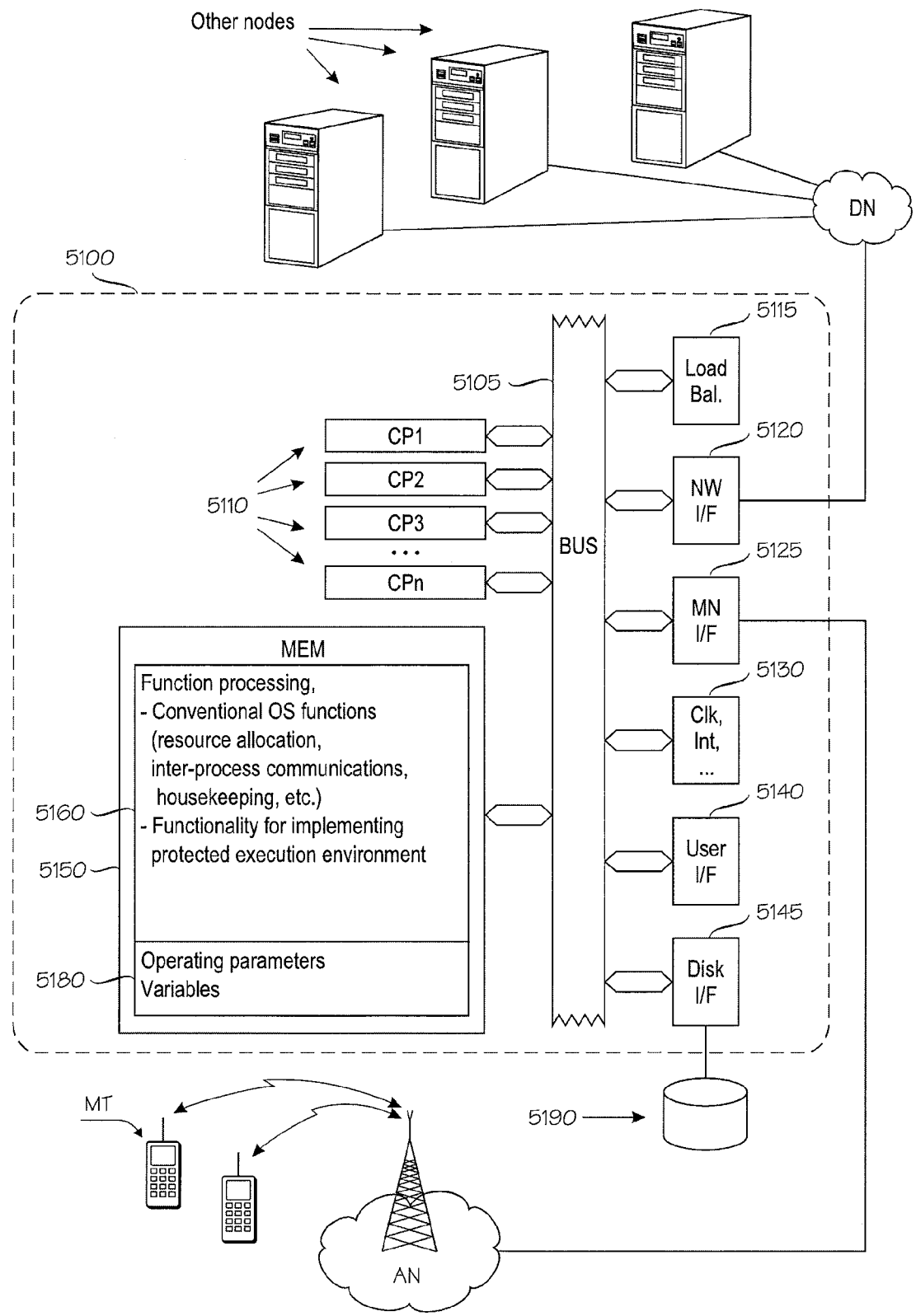
FIG. 5 schematically shows a data processing system adapted for carrying out embodiments of the present disclosure.

FIG. 5 schematically shows a data processing system adapted for carrying out embodiments of the present disclosure. The architecture of the computer, generally denoted by reference numeral 5100, comprises one or more central processing units CP1 . . . CPn, generally denoted by reference numeral 5110.

Embodiments comprising multiple processing units 5110 are preferably provided with a load balancing unit 5115 that balances processing load among the multiple processing units 5110. The multiple processing units 5110 may be implemented as separate processor components or as physical processor cores or virtual processors within a single component case. The one or more processing units 5110 preferably comprise a cache memory system to speed up retrieval of memory contents. In a typical implementation the computer architecture 5100 comprises a network interface 5120 for communicating with various data networks, which are generally denoted by reference sign DN. The data networks DN may include local-area networks, such as an Ethernet network, and/or wide-area networks, such as the internet. The data processing system may also reside in a smart telephone, in which case reference numeral 5125 denotes a mobile network interface, through which the smart telephone may communicate with various access networks AN.

The computer architecture 5100 may also comprise a local user interface 5140. Depending on implementation, the user interface 5140 may comprise local input-output circuitry for a local user interface, such as a keyboard, mouse and display (not shown). The computer architecture also comprises memory 5150 for storing program instructions, operating parameters and variables. Reference numeral 5160 denotes a program suite for the server computer 5100.

The computer architecture 5100 also comprises circuitry for various clocks, interrupts and the like, and these are generally depicted by reference numeral 5130. The computer architecture 5100 further comprises a storage interface 5145 to a storage system 5190. When the server computer 5100 is switched off, the storage system 5190 may store the software that implements the processing functions, and on power-up, the software is read into semiconductor memory 5150. The storage system 5190 also retains operating and variables over power-off periods. The various elements 5110 through 5150 intercommunicate via a bus 5105, which carries address signals, data signals and control signals, as is well known to those skilled in the art.

The inventive techniques may be implemented in the computer architecture 5100 as follows. The program suite 5160 comprises program code instructions for instructing the processor or set of processors 5110 to execute the functions of the inventive method in its various embodiments.

In this description, numerous specific details are set forth. However, the embodiments/cases of the invention may be practiced without some of these specific details. In other instances, well-known hardware, materials, structures and techniques have not been shown in detail in order not to obscure the understanding of this description. In this description, references to "one embodiment" and "one case" mean that the feature being referred to may be included in at least one embodiment/case of the invention. Moreover, separate references to "one embodiment", "some embodiments", "one case", or "some cases" in this description do not necessarily refer to the same embodiment/case. Illustrated embodiments/cases are not mutually exclusive, unless so stated and except as will be readily apparent to those of ordinary skill in the art. Thus, the invention may include any variety of combinations and/or integrations of the features of the embodiments/cases described herein. Also herein, flow diagrams illustrate non-limiting embodiment/case examples of the methods, and block diagrams illustrate non-limiting embodiment/case examples of the devices. Some operations in the flow diagrams may be described with reference to the embodiments/cases illustrated by the block diagrams. However, the methods of the flow diagrams could be performed by embodiments/cases of the invention other than those discussed with reference to the block diagrams, and embodiments/cases discussed with reference to the block diagrams could perform operations different from those discussed with reference to the flow diagrams. Moreover, although the flow diagrams may depict serial operations, certain embodiments/cases could perform certain operations in parallel and/or in different orders from those depicted. Moreover, the use of repeated reference numerals and/or letters in the text and/or drawings is for the purpose of simplicity and clarity and does not in itself dictate a relationship between the various embodiments/cases and/or configurations discussed. Furthermore, methods and mechanisms of the embodiments/cases will sometimes be described in singular form for clarity. However, some embodiments/cases may include multiple iterations of a method or multiple instantiations of a mechanism unless noted otherwise. For example, when a controller or an interface are disclosed in an embodiment/case, the scope of the embodiment/case is intended to also cover the use of multiple controllers or interfaces.

Certain features of the embodiments/cases, which may have been, for clarity, described in the context of separate embodiments/cases, may also be provided in various combinations in a single embodiment/case. Conversely, various features of the embodiments/cases, which may have been, for brevity, described in the context of a single embodiment/case, may also be provided separately or in any suitable sub-combination. The embodiments/cases are not limited in their applications to the details of the order or sequence of steps of operation of methods, or to details of implementation of devices, set in the description, drawings, or examples. In addition, individual blocks illustrated in the figures may be functional in nature and do not necessarily correspond to discrete hardware elements. While the methods disclosed herein have been described and shown with reference to particular steps performed in a particular order, it is understood that these steps may be combined, sub-divided, or reordered to form an equivalent method without departing from the teachings of the embodiments/cases. Accordingly, unless specifically indicated herein, the order and grouping of the steps is not a limitation of the embodiments/cases. Embodiments/cases described in conjunction with specific examples are presented by way of example, and not limitation. Moreover, it is evident that many alternatives, modifications and variations will be apparent to those skilled in the art. Accordingly, it is intended to embrace all such alternatives, modifications and variations that fall within the spirit and scope of the appended claims and their equivalents.

What is claimed is:

1. A method for enabling execution of encrypted electronic content in a client system, comprising:
   retrieving encrypted electronic content;
   asking a virtual machine to execute the encrypted program;
   loading a kernel and the virtual machine to a first memory region in a CPU, and disabling synchronization between the first memory region and a second memory region in a client system;
   validating an electronic validation protocol stack to confirm readiness of the client system to execute the encrypted electronic content;
   copying the encrypted electronic content to another location in the second memory region;
   filling the original location of the second memory region with illegal instructions;
   installing in the operating system an illegal instruction handler;
   jumping to the encrypted electronic content's entry function;
   wherein the validation includes:
      requesting a server to execute an electronic validation protocol stack validation for an encrypted electronic content;
      receiving notification of the validation protocol stack confirmation results;
      if the electronic validation protocol stack validation has succeeded, requesting a decryption key from a server;
      receiving the requested decryption key; and
      storing the decryption key in the first memory region.

2. The method of claim 1, in which the encrypted electronic content comprises a program selected from the group of word processing program, spreadsheet manipulation program, and visual presentation program.

3. The method of claim 1, in which the encrypted electronic content comprises audio and video data.

4. The method of claim 1, in which the encrypted electronic content comprises a gaming program.

5. The method of claim 1, in which the encrypted electronic content comprises a video.

6. A method for managing the first memory region as part of a process for executing encrypted electronic content, comprising:
   loading a kernel and a virtual machine to the first memory region;
   disabling synchronization between the first memory region and the second memory region;
   validating an electronic validation protocol stack to confirm readiness of a client system to execute encrypted electronic content;
   decrypting the encrypted electronic content, and storing decrypted data blocks;
   repeating said decrypting and storing data blocks until execution is terminated; and
   re-enabling synchronization between the first memory region and the second memory region,
   wherein the validating includes:
      requesting a server to execute an electronic validation protocol stack validation for an encrypted electronic content;
      receiving notification of the validation protocol stack confirmation results;
      if the electronic validation protocol stack validation has succeeded, requesting a decryption key from a server;
      receiving the requested decryption key; and
      storing the decryption key in the first memory region.

7. The method of claim 6 further comprising erasing the encryption key from the first memory region.

8. The method of claim 6, in which the encrypted electronic content comprises a program selected from the group of word processing program, spreadsheet manipulation program, and visual presentation program.

9. The method of claim 6, in which the encrypted electronic content comprises audio and video data.

10. The method of claim 6, in which the encrypted electronic content comprises a gaming program.

11. The method of claim 7, in which the encrypted electronic content comprises a program selected from the group of word processing program, spreadsheet manipulation program, and visual presentation program.

12. The method of claim 7, in which the encrypted electronic content comprises audio and video data.

13. The method of claim 7, in which the encrypted electronic content comprises a gaming program.

14. A client system for enabling execution of encrypted electronic content, the client system comprising:
   a processing system comprising at least one central processing unit <"CPU">,
   a memory system having a first memory region and a second memory region, the memory system comprising program code instructions for carrying out the following acts when the program code instructions are executed by the processing system:
   retrieving encrypted electronic content;
   asking a virtual machine to execute the encrypted program;
   loading a kernel and the virtual machine to a first memory region in a CPU, and disabling synchronization between the first memory region and a second memory region in a client system;
   validating an electronic validation protocol stack to confirm readiness of the client system to execute the encrypted electronic content;
   copying the encrypted electronic content to another location in the second memory region;
   filling the original location of the second memory region with illegal instructions;
   installing in the operating system an illegal instruction handler;
   jumping to the encrypted electronic content's entry function, wherein the validating includes:
      requesting a server to execute an electronic validation protocol stack validation for an encrypted electronic content;
      receiving notification of the validation protocol stack confirmation results;
      if the electronic validation protocol stack validation has succeeded, requesting a decryption key from a server;
      receiving the requested decryption key; and
      storing the decryption key in the first memory region.

* * * * *